Figure 2:
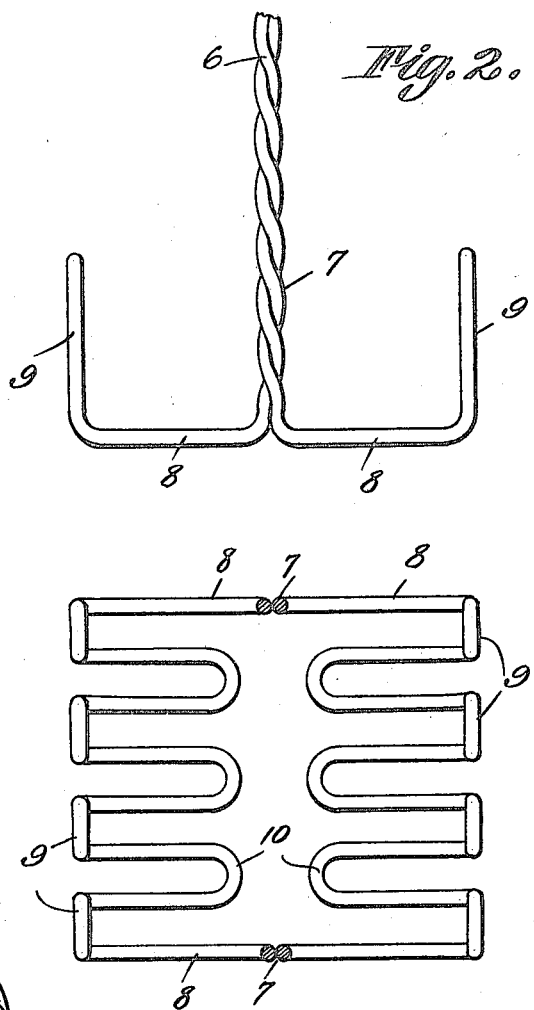

H. M. GREENER.
CULINARY IMPLEMENT.
APPLICATION FILED JUNE 9, 1921.

1,386,704.

Patented Aug. 9, 1921.

Inventor
Herman M. Greener,
By Henry J. Bruington,
Attorney

UNITED STATES PATENT OFFICE.

HERMAN M. GREENER, OF CHICAGO, ILLINOIS.

CULINARY IMPLEMENT.

1,386,704. Specification of Letters Patent. Patented Aug. 9, 1921.

Application filed June 9, 1921. Serial No. 476,117.

*To all whom it may concern:*

Be it known that I, HERMAN M. GREENER, a citizen of the United States, residing at the city of Chicago, in the county of Cook and State of Illinois, have invented certain new and useful Improvements in Culinary Implements, of which the following is a specification.

This invention relates to culinary implements, and its object is to provide a combination device which can be used as a potato masher and creamer, a vegetable lifter, and an egg beater, as well as an agitator, stirrer or mixing device.

The invention also has for its object to provide a very simple and efficient combination implement of the kind stated, and also one which can be easily and cheaply constructed.

With the objects stated in view, the invention consists in a novel combination and arrangement of parts to be hereinafter described and claimed, and in order that the same may be better understood, reference is had to the accompanying drawing forming a part of this specification.

In the drawing—

Figure 3:
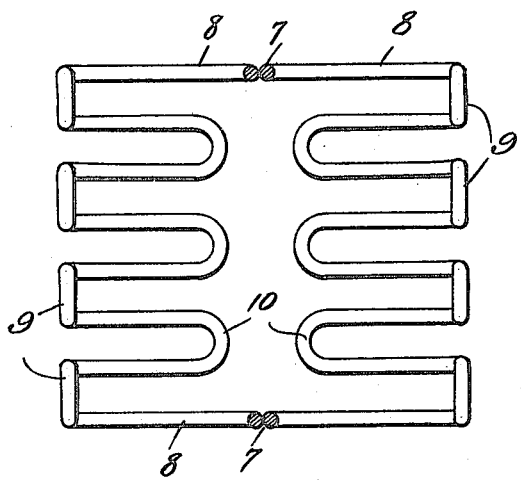
Figure 1:
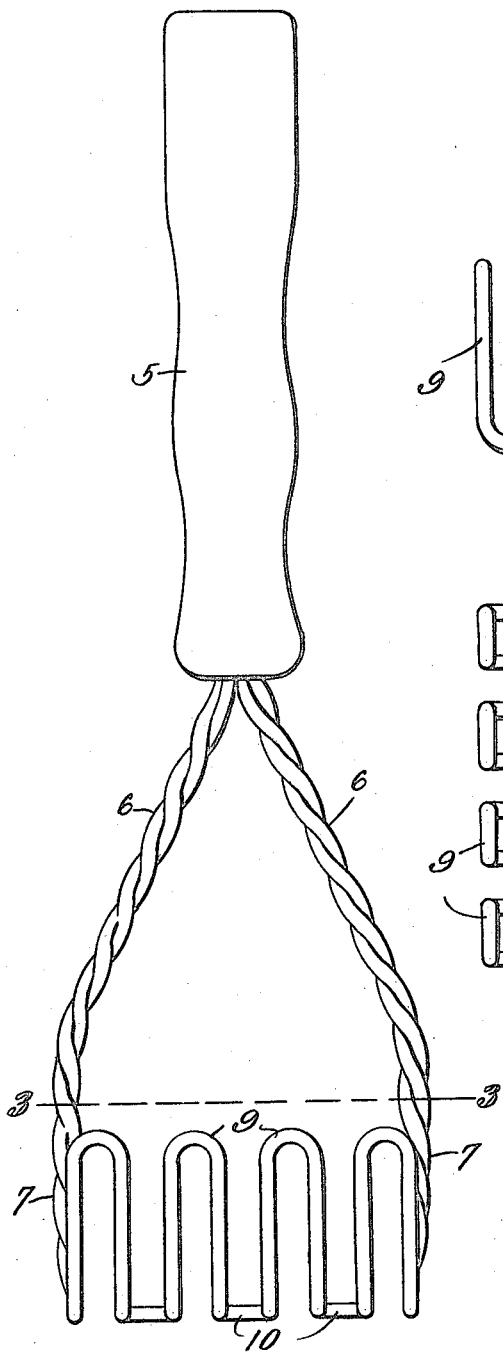

Figure 1 is a front elevation of the device; Fig. 2 is a side elevation of the dasher part of the device, and Fig. 3 is a horizontal section on the line 3—3 of Fig. 1.

The device is composed of a wooden or other simple handle 5, and a dasher, which latter is constructed entirely of wire, and is provided with a shank for attachment to the handle, the forward end of the latter having a longitudinal hole into which the shank is inserted and in which it is secured in any approved manner.

The shank of the dasher is composed of two laterally spaced side members 8 which are brought together at one end for insertion into the handle. The members 6 diverge in the direction of the forward ends for some distance, and they then extend parallel to each other to their forward extremity, as shown at 7.

Each member 6 is composed of two strands of wire which are twisted together as clearly shown in Fig. 1 to obtain the necessary rigidity. At the outer ends of the parts 7, the wire strands of which each is composed, are spread laterally and extended in opposite directions horizontally, as shown at 8, and also crosswise. The transverse portion of each wire is bent into a plurality of spaced and parallel fingers joined by return bends. Alternate pairs of these fingers are bent to extend at right angles to the other fingers, so that said pairs extend in vertical and horizontal directions alternately, the former being shown at 9 and the latter at 10. The horizontal pairs of fingers 10 are turned inwardly toward each other, as shown in Fig. 3.

It will be understood, of course, that the terms "vertical" and "horizontal" as applied to the fingers 9 and 10 are correct only when the device is positioned as shown in Fig. 1, this being its position when used for lifting vegetables or other articles. The parts 7, 8, 9 and 10 now form a rectangular basket-like structure, the parts 8 and 10 being the bottom, and the parts 7 and 9 being the sides and preventing the articles from slipping off the former, and as the basket is of open-work construction, it can be used for holding vegetables or other articles to allow water or other liquid to drain off the same.

When the device is to be used as a potato masher or creamer, it is reciprocated up and down while in the position shown in Fig. 1, the bottom grating formed by the parts 10 now being the active portion of the device. For beating eggs, the device is used in the same manner as an ordinary egg beater, the upstanding parts 9 now operating as dasher fingers.

The device can be easily and cheaply constructed as the entire dasher portion is made of wire which can be readily bent into the shape shown.

I claim:

1. A culinary implement comprising a handle, and a dasher at the forward end thereof, said dasher comprising a shank attached to the handle and having a plurality of laterally spaced fingers at its forward end, said fingers being arranged alternately at right angles to each other.

2. A culinary implement comprising a handle, and a dasher carried thereby, said dasher comprising a shank attached to the handle and having a plurality of laterally spaced fingers at its forward end, said fingers being arranged in pairs extending alternately at right angles to each other.

3. A culinary implement comprising a handle, and a dasher carried thereby, said dasher comprising a shank attached to the handle and having a plurality of laterally spaced fingers at its forward end, certain of said fingers being arranged to form a grating, and other ones of the fingers being located in upstanding position at opposite ends of the grating.

4. A culinary implement comprising a handle, and a dasher carried thereby, said dasher comprising a shank having laterally spaced side portions each of which is composed of wire strands which are twisted together, said strands at the outer ends of the side portions having lateral bends in opposite directions, and said lateral bends of the respective sides having transverse connecting portions, said transverse connecting portions being bent to form a plurality of laterally spaced fingers, and said fingers being arranged in pairs which are positioned at right angles to each other alternately.

5. A culinary implement comprising a handle, and a dasher carried thereby, said dasher comprising a shank having laterally spaced side portions each of which is composed of wire strands which are twisted together, said strands at the outer ends of the side portions having lateral bends in opposite directions, and said lateral bends of the respective sides having transverse connecting portions which are bent to form a plurality of laterally spaced fingers, said fingers being arranged in pairs which are positioned at right angles to each other alternately, and alternate ones of said fingers of one side extending in the direction of corresponding fingers of the other side.

In testimony whereof I affix my signature.

HERMAN M. GREENER.